United States Patent
Cerny

(10) Patent No.: US 9,710,881 B2
(45) Date of Patent: Jul. 18, 2017

(54) VARYING EFFECTIVE RESOLUTION BY SCREEN LOCATION BY ALTERING RASTERIZATION PARAMETERS

(71) Applicant: Sony Computer Entertainment America LLC, San Mateo, CA (US)

(72) Inventor: Mark Evan Cerny, Los Angeles, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 204 days.

(21) Appl. No.: 14/246,063

(22) Filed: Apr. 5, 2014

(65) Prior Publication Data

US 2015/0287166 A1    Oct. 8, 2015

(51) Int. Cl.
   *G06T 13/00*    (2011.01)
   *G06T 15/00*    (2011.01)
   (Continued)

(52) U.S. Cl.
   CPC ........... *G06T 3/40* (2013.01); *G02B 27/0172* (2013.01); *G06T 1/60* (2013.01); *G06T 15/005* (2013.01);
   (Continued)

(58) Field of Classification Search
   CPC ... G02B 27/0172; G06T 15/005; G06T 15/04; G06T 15/80; G06T 17/10; G06T 17/20; G06T 1/60; G06T 2210/36; G06T 3/40
   See application file for complete search history.

(56) References Cited

U.S. PATENT DOCUMENTS

| | | | |
|---|---|---|---|
| 5,130,794 A | * | 7/1992 | Ritchey ............... F41G 7/30 348/383 |
| 5,224,208 A | * | 6/1993 | Miller, Jr. ........... G06T 15/04 345/426 |

(Continued)

FOREIGN PATENT DOCUMENTS

| TW | I250785 B | 3/2006 |
|---|---|---|
| TW | 200919376 A | 5/2009 |

(Continued)

OTHER PUBLICATIONS

International Search Report and Written Opinion for International Application No. PCT/US2015/024303, dated Jul. 1, 2015.

(Continued)

*Primary Examiner* — Sing-Wai Wu
(74) *Attorney, Agent, or Firm* — JDI Patent; Joshua D. Isenberg; Robert A. Pullman

(57) ABSTRACT

In graphics processing data is received representing one or more vertices for a scene in a virtual space. Primitive assembly is performed on the vertices to compute projections of the vertices from virtual space onto a viewport of the scene in a screen space of a display device containing a plurality of pixels, the plurality of pixels being subdivided into a plurality of subsections. Scan conversion determines which pixels of the plurality of pixels are part of each primitive that has been converted to screen space coordinates. Coarse rasterization for each primitive determines which subsection or subsections the primitive overlaps. Metadata associated with the subsection a primitive overlaps determines a pixel resolution for the subsection. The metadata is used in processing pixels for the subsection to generate final pixel values for the viewport of the scene that is displayed on the display device in such a way that parts (Continued)

of the scene in two different subsections have different pixel resolution.

41 Claims, 9 Drawing Sheets

(51) Int. Cl.
- G06T 3/40 (2006.01)
- G02B 27/01 (2006.01)
- G06T 1/60 (2006.01)
- G06T 15/04 (2011.01)
- G06T 15/80 (2011.01)
- G06T 17/10 (2006.01)
- G06T 17/20 (2006.01)

(52) U.S. Cl.
CPC ............... *G06T 15/04* (2013.01); *G06T 15/80* (2013.01); *G06T 17/10* (2013.01); *G06T 17/20* (2013.01); *G06T 2210/36* (2013.01)

(56) References Cited

U.S. PATENT DOCUMENTS

| | | | |
|---|---|---|---|
| 5,422,653 A * | 6/1995 | Maguire, Jr. | G02B 27/2228 345/9 |
| 5,602,391 A | 2/1997 | Pines et al. | |
| 5,777,913 A | 7/1998 | Rasmusson | |
| H1812 H | 11/1999 | Arcuri | |
| 6,313,838 B1 | 11/2001 | Deering | |
| 6,469,700 B1 | 10/2002 | Munshi et al. | |
| 6,731,298 B1 | 5/2004 | Moreton et al. | |
| 6,804,066 B1 * | 10/2004 | Ha | G02B 5/1814 359/683 |
| 6,967,663 B1 | 11/2005 | Bastos et al. | |
| 7,161,603 B2 | 1/2007 | Saito et al. | |
| 7,336,277 B1 | 2/2008 | Clark et al. | |
| 7,339,594 B1 | 3/2008 | Newhall et al. | |
| 7,426,724 B2 | 9/2008 | Kilgard et al. | |
| 7,511,717 B1 | 3/2009 | Bastos et al. | |
| 7,907,792 B2 | 3/2011 | Harville | |
| 7,916,155 B1 | 3/2011 | Moreton | |
| 8,090,383 B1 | 1/2012 | Emigh et al. | |
| 8,144,156 B1 * | 3/2012 | Baldwin | G06T 15/005 345/501 |
| 8,233,004 B1 | 7/2012 | Molnar et al. | |
| 8,300,059 B2 | 10/2012 | Isidoro et al. | |
| 8,581,929 B1 | 11/2013 | Maguire | |
| 8,669,999 B2 | 3/2014 | Donovan et al. | |
| 2003/0086603 A1 | 5/2003 | Davidson et al. | |
| 2003/0122833 A1 | 7/2003 | Doyle | |
| 2003/0234784 A1 | 12/2003 | Grzeszczuk et al. | |
| 2004/0036692 A1 | 2/2004 | Alcorn et al. | |
| 2005/0225670 A1 | 10/2005 | Wexler et al. | |
| 2006/0256112 A1 | 11/2006 | Heirich et al. | |
| 2006/0277520 A1 | 12/2006 | Gennari | |
| 2007/0018988 A1 | 1/2007 | Guthe | |
| 2007/0165035 A1 | 7/2007 | Duluk et al. | |
| 2007/0183649 A1 | 8/2007 | Kiefer et al. | |
| 2008/0062164 A1 | 3/2008 | Bassi et al. | |
| 2008/0106489 A1 | 5/2008 | Brown et al. | |
| 2008/0113792 A1 | 5/2008 | Yamada et al. | |
| 2008/0129748 A1 | 6/2008 | Bakalash et al. | |
| 2009/0141033 A1 | 6/2009 | Street | |
| 2010/0002000 A1 | 1/2010 | Everitt et al. | |
| 2010/0007662 A1 | 1/2010 | Cox et al. | |
| 2010/0104162 A1 | 4/2010 | Falk et al. | |
| 2010/0156919 A1 | 6/2010 | Bala et al. | |
| 2010/0214294 A1 | 8/2010 | Li et al. | |
| 2011/0090242 A1 | 4/2011 | Frederiksen | |
| 2011/0134136 A1 | 6/2011 | Seiler | |
| 2011/0188744 A1 | 8/2011 | Sun | |
| 2011/0216069 A1 | 9/2011 | Keall et al. | |
| 2012/0069021 A1 * | 3/2012 | Son | G06T 15/40 345/426 |
| 2012/0092366 A1 | 4/2012 | Smithers et al. | |
| 2012/0206452 A1 | 8/2012 | Geisner et al. | |
| 2012/0293486 A1 | 11/2012 | Adachi | |
| 2012/0293519 A1 | 11/2012 | Ribble et al. | |
| 2013/0021358 A1 | 1/2013 | Nordlund et al. | |
| 2013/0063440 A1 | 3/2013 | Son et al. | |
| 2013/0093766 A1 | 4/2013 | Hutchins et al. | |
| 2013/0114680 A1 | 5/2013 | Leontaris et al. | |
| 2013/0120380 A1 | 5/2013 | Kallio et al. | |
| 2013/0265309 A1 | 10/2013 | Goel et al. | |
| 2013/0300740 A1 | 11/2013 | Snyder et al. | |
| 2013/0342547 A1 | 12/2013 | Lum et al. | |
| 2014/0049549 A1 | 2/2014 | Lukyanov et al. | |
| 2014/0063016 A1 | 3/2014 | Howson et al. | |

FOREIGN PATENT DOCUMENTS

| | | |
|---|---|---|
| TW | 201001329 A | 1/2010 |
| TW | 201143466 A | 12/2011 |

OTHER PUBLICATIONS

International Search Report and Written Opinion for International Application No. PCT/US2015/21951, dated Jul. 1, 2015.
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US201521982, dated Jul. 1, 2015.
U.S. Appl. No. 14/678,445, to Mark Evan Cerny, filed Apr. 3, 2015.
Matthaus G. Chajdas, Morgan McGuire, David Luebke; "Subpixel Reconstruction Antialiasing for Deferred Shading" in i3D, Feb. 2011.
U.S. Appl. No. 14/246,061, to Tobias Berghoff, filed Apr. 5, 2014.
U.S. Appl. No. 14/246,062, to Mark Evan Cerny, filed Apr. 5, 2014.
U.S. Appl. No. 14/246,068, to Mark Evan Cerny, filed Apr. 5, 2014.
U.S. Appl. No. 14/246,064, to Tobias Berghoff, filed Apr. 5, 2014.
U.S. Appl. No. 14/246,067, to Tobias Berghoff, filed Apr. 5, 2014.
U.S. Appl. No. 61/975,774, to Mark Evan Cerny, filed Apr. 5, 2014.
U.S. Appl. No. 14/246,066, to Mark Evan Cerny, filed Apr. 5, 2014.
Non-Final Office Action for U.S. Appl. No. 14/246,061, dated Jan. 4, 2016.
Non-Final Office Action for U.S. Appl. No. 14/246,062, dated Jan. 14, 2016.
Non-Final Office Action for U.S. Appl. No. 14/246,064, dated Feb. 1, 2015.
Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,068, dated Jan. 14, 2016.
Taiwanese Office Action for TW Application No. 104108773, dated Dec. 22, 2015.
Final Office Action for U.S. Appl. No. 14/246,061, dated Jun. 17, 2016.
Final Office Action for U.S. Appl. No. 14/246,062, dated Jul. 15, 2016.
Final Office Action for U.S. Appl. No. 14/246,064, dated Jul. 11, 2016.
Final Office Action for U.S. Appl. No. 14/246,066, dated Jul. 20, 2016.
Final Office Action for U.S. Appl. No. 14/246,067, dated Jun. 17, 2016.
Notice of Allowance for U.S. Appl. No. 14/246,068, dated Jul. 15, 2016.

(56) References Cited

OTHER PUBLICATIONS

John D. Owens, Mike Houston, David Luebke, Simon Green, John E Stone, and James C. Phillips, "GPU Computing", Proceeding of IEEE, May 2008, p. 879-899.
Non-Final Office Action for U.S. Appl. No. 14/246,064, dated Dec. 8, 2016.
Non-Final Office Action for U.S. Appl. No. 14/246,066, dated Dec. 30, 2016.
Non-Final Office Action for U.S. Appl. No. 14/246,067, dated Oct. 27, 2016.
Non-Final Office Action for U.S. Appl. No. 14/678,445, dated Dec. 30, 2016.
Non-Final Office Action for U.S. Appl. No. 14/246,061, dated Oct. 20, 2016.
Notice of Allowance for U.S. Appl. No. 14/246,062, dated Jan. 4, 2017.
Taiwan Office Action for TW Application No. 104108777, dated Jun. 27, 2016.
Taiwanese Office Action for TW Application No. 104108774, dated Sep. 12, 2016.
Non-Final Office Action for U.S. Appl. No. 15/351,310, dated Feb. 6, 2017.
Final Office Action for U.S. Appl. No. 14/246,061, dated Apr. 7, 2017.
Final Office Action for U.S. Appl. No. 14/246,064, dated May 5, 2017.
Final Office Action for U.S. Appl. No. 14/246,066, dated Apr. 7, 2017.
Notice of Allowance for U.S. Appl. No. 14/246,067, dated Mar. 16, 2017.

* cited by examiner 114 degree FOV 90 degree FOV

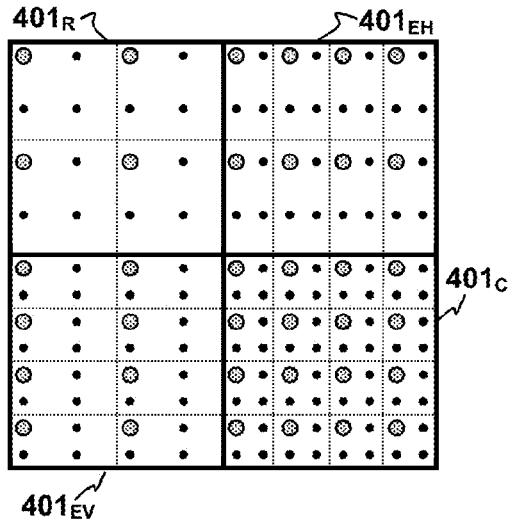
FIG. 4B
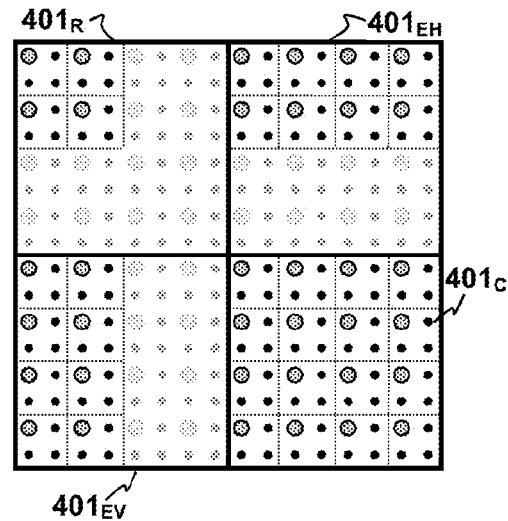
FIG. 4C
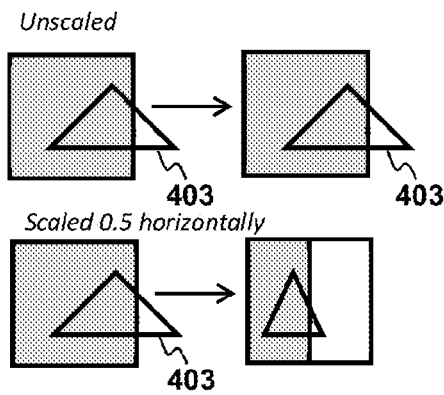
FIG. 4D
FIG. 4E
FIG. 4F

MRT is 1440x1440 pixels

| 320 | 800 | 320 |
|---|---|---|
| 0.5/0.5 | 0.5/1 | 0.5/0.5 |
| 1/0.5 | 1/1 | 1/0.5 |
| 0.5/0.5 | 0.5/1 | 0.5/0.5 |

MRT "feels like" 1120x1120 pixels (60% area)

| 160 | 800 | 160 |
|---|---|---|
| 0.5/0.5 | 0.5/1 | 0.5/0.5 |
| 1/0.5 | 1/1 | 1/0.5 |
| 0.5/0.5 | 0.5/1 | 0.5/0.5 |

FIG. 5A

MRT is 1440x1440 pixels

| 192 | 256 | 544 | 256 | 192 |
|---|---|---|---|---|
| 0.5/0.5 | 0.75/0.5 | 1/0.5 | 0.75/0.5 | 0.5/0.5 |
| 0.5/0.75 | 0.75/0.75 | 1/0.75 | 0.75/0.75 | 0.5/0.75 |
| 0.5/1 | 0.75/1 | 1/1 | 0.75/1 | 0.5/1 |
| 0.5/0.75 | 0.75/0.75 | 1/0.75 | 0.75/0.75 | 0.5/0.75 |
| 0.5/0.5 | 0.75/0.5 | 1/0.5 | 0.75/0.5 | 0.5/0.5 |

FIG. 5B

VARYING EFFECTIVE RESOLUTION BY SCREEN LOCATION BY ALTERING RASTERIZATION PARAMETERS

CROSS REFERENCE TO RELATED APPLICATIONS

This application is related to commonly-assigned, co-pending US patent application Ser. No. 14/246,064, to Tobias Berghoff, entitled "METHOD FOR EFFICIENT CONSTRUCTION OF HIGH RESOLUTION DISPLAY BUFFERS", filed the same day as the present application, the entire contents of which are herein incorporated by reference.

This application is related to commonly-assigned, co-pending US patent application Ser. No. 14/246,067, to Tobias Berghoff, entitled "GRAPHICS PROCESSING ENHANCEMENT BY TRACKING OBJECT AND/OR PRIMITIVE IDENTIFIERS", filed the same day as the present application, the entire contents of which are herein incorporated by reference.

This application is related to commonly-assigned, co-pending US patent application Ser. No. 14/246,068, to Mark Evan Cerny, entitled "GRADIENT ADJUSTMENT FOR TEXTURE MAPPING TO NON-ORTHONORMAL GRID", filed the same day as the present application, the entire contents of which are herein incorporated by reference.

This application is related to commonly-assigned, co-pending US patent application Ser. No. 14/246,061, to Tobias Berghoff, entitled "VARYING EFFECTIVE RESOLUTION BY SCREEN LOCATION BY CHANGING ACTIVE COLOR SAMPLE COUNT WITHIN MULTIPLE RENDER TARGETS", filed the same day as the present application, the entire contents of which are herein incorporated by reference.

This application is related to commonly-assigned, co-pending US patent application Ser. No. 14/246,066, to Mark Evan Cerny, entitled "VARYING EFFECTIVE RESOLUTION BY SCREEN LOCATION IN GRAPHICS PROCESSING BY APPROXIMATING PROJECTION OF VERTICES ONTO CURVED VIEWPORT", filed the same day as the present application, the entire contents of which are herein incorporated by reference.

This application is related to commonly-assigned, co-pending US patent application Ser. No. 14/246,062, to Mark Evan Cerny, entitled "GRADIENT ADJUSTMENT FOR TEXTURE MAPPING FOR MULTIPLE RENDER TARGETS WITH RESOLUTION THAT VARIES BY SCREEN LOCATION", filed the same day as the present application, the entire contents of which are herein incorporated by reference.

FIELD OF THE DISCLOSURE

Aspects of the present disclosure are related to computer graphics. In particular, the present disclosure is related to varying resolution by screen location.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send the GPU instructions, commonly referred to as draw commands, that instruct the GPU to implement a particular graphics processing task, e.g., render a particular texture that has changed with respect to a previous frame in an image. These draw commands may be coordinated by the CPU with a graphics application programming interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known as primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and other information that associates particular vertices with particular polygons.

As part of the graphics pipeline, the GPU may perform rendering tasks by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The fragment shaders may manipulate values relevant to applying textures to primitives. The pipeline may also include other shaders at various stages in the pipeline, such as geometry shaders that use the output of the vertex shaders to generate a new set of primitives, as well as compute shaders (CS) which may be implemented by a GPU to perform certain other general computational tasks.

Graphical display devices having a wide field of view (FOV) have been developed. Such devices include head mounted display (HMD) devices. In an HMD device, a small display device is worn on a user's head. The display device has a display optic in front of one eye (monocular HMD) or each eye (binocular HMD). An HMD device typically includes sensors that can sense the orientation of the device and change the scene shown by the display optics as the user's head moves. Conventionally, most stages of rendering scenes for wide FOV displays are performed by planar rendering, where all parts of the screen have the same number of pixels per unit area.

To provide a realistic experience it is desirable for the graphics presented by a wide FOV display device to be of high quality and efficiently rendered.

It is within this context that the present disclosure arises.

BRIEF DESCRIPTION OF THE DRAWINGS

The teachings of the present disclosure can be readily understood by considering the following detailed description in conjunction with the accompanying drawings, in which:

FIG. 4B is schematic diagram illustrating a portion of a screen space in which in which pixel resolution varies by screen location in accordance with aspects of the present disclosure.

FIG. 4C is a schematic diagram illustrating utilization of a portion of memory corresponding to the portion of screen space depicted in FIG. 4B.

FIG. 4D is set of schematic diagrams illustrating scaling of gradients for texture mapping to a primitive in a portion of a screen space in which in which pixel resolution varies by screen location in accordance with an aspect of the present disclosure.

FIG. 4E is a schematic diagram illustrating an example of a metadata configuration for implementing pixel resolution varying by screen location in accordance with aspects of the present disclosure.

FIG. 4F is a schematic diagram illustrating an alternative example of a metadata configuration for implementing pixel resolution varying by screen location in accordance with aspects of the present disclosure.

FIG. 5A is a block diagram illustrating an example of a multiple render target in which pixel resolution varies by screen location in accordance with aspects of the present disclosure.

FIG. 5B is a block diagram illustrating an alternative example of a multiple render target in which pixel resolution varies by screen location in accordance with aspects of the present disclosure.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1A:
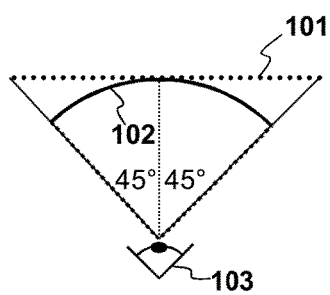
FIG. 1A and FIG. 1B are simplified diagrams illustrating certain parameters of wide field of view (FOV) displays.
Figure 1B:
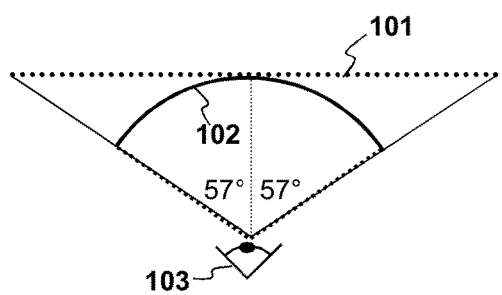
Figure 1C:
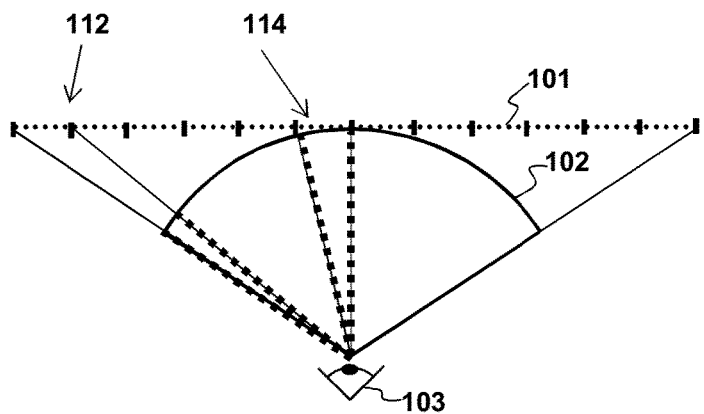
FIG. 1C illustrates different solid angles for different portions of a wide FOV display.

FIGS. 1A-1C illustrate a previously unappreciated problem with large FOV displays. FIG. 1A illustrates a 90 degree FOV display and FIG. 1B illustrates a 114 degree FOV display. In a conventional large FOV display, three dimensional geometry is rendered using a planar projection to the view plane 101. However, it turns out that rendering geometry onto a high FOV view plane is very inefficient. As may be seen in FIG. 1C, edge regions 112 and central regions 114 of view plane 101 are the same area but represent very different solid angles, as seen by a viewer 103. Consequently, pixels near the edge of the screen hold much less meaningful information than pixels near the center. When rendering the scene conventionally, these regions have the same number of pixels and the time spent rendering equal sized regions on the screen is the same.

Figure 2A:
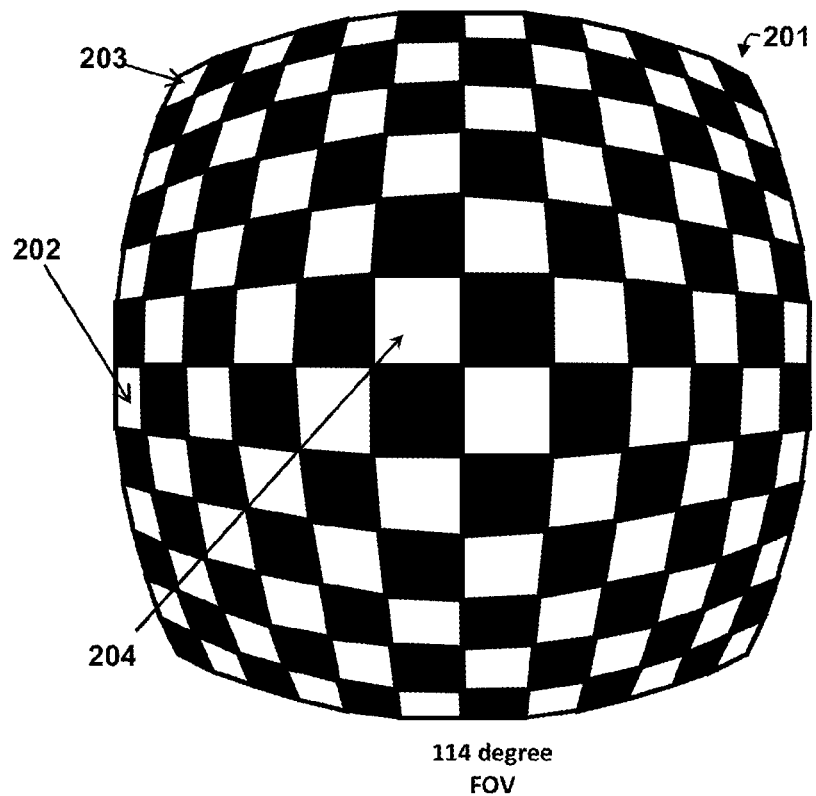
FIGS. 2A-2C illustrate examples of the relative importance of pixels in different regions of different wide FOV displays in accordance with aspects of the present disclosure.
Figure 2B:
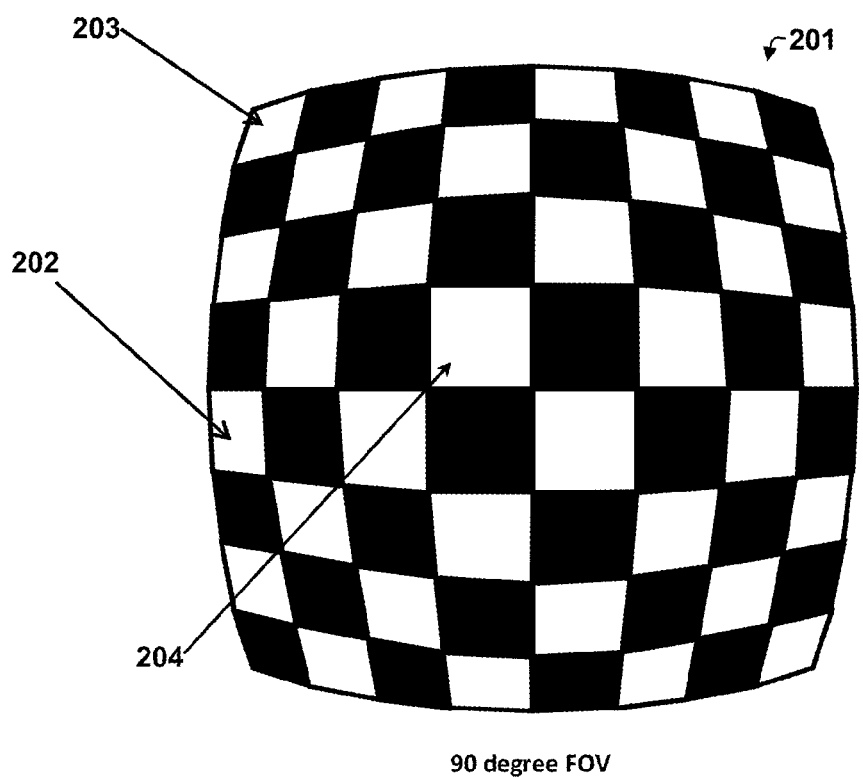
Figure 2C:
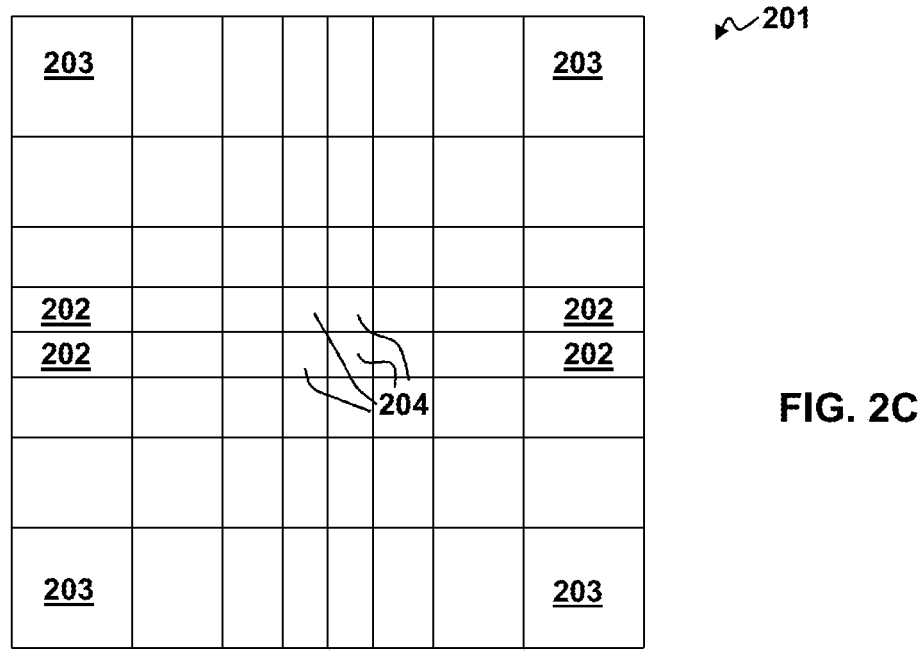

FIGS. 2A-2C illustrate the relative importance of different portions of a large FOV display in two dimensions for different sized fields of view. FIG. 2A expresses the variance in solid angle for each square of a planar checkerboard perpendicular to the direction of view, in the case that the checkerboard subtends an angle of 114 degrees. In other words, it expresses the inefficiency of conventional planar projective rendering to a 114 degree FOV display. FIG. 2B expresses the same information for a 90 degree FOV display. In such planar projective rendering, the projection compresses tiles 202 in the image 201 that are at the edges and tiles 203 at the corners into smaller solid angles compared to tiles 204 at the center. Because of this compression, and the fact that each tile in the image 201 has the same number of pixels in screen space, there is an inefficiency factor of roughly 4× for rendering the edge tiles 202 compared to the center tiles 204. By this it is meant that conventional rendering of the edge tiles 202 involves 4 times as much processing per unit solid angle than for the center tiles 204. For the corner tiles 203, the inefficiency factor is roughly 8×. When averaged over the whole image 201, the inefficiency factor is roughly 2.5×.

The inefficiency is dependent on the size of the FOV. For example, for the 90 degree FOV display shown in FIG. 2B, the inefficiency factors are roughly 2× for rendering the edge tiles 202, roughly 3× for rendering the corner tiles 203, and roughly 1.7× overall for rendering the image 201.

Another way of looking at this situation is shown in FIG. 2C, in which the screen 102 has been divided into rectangles of approximately equal "importance" in terms of pixels per unit solid angle subtended. Each rectangle makes roughly the same contribution to the final image as seen through the display. One can see how the planar projection distorts the importance of edge rectangles 202 and corner rectangles 203. In fact, the corner rectangles 203 might make less of a contribution to the center rectangles due to the display optics, which may choose to make the visual density of pixels (as expressed as pixels per solid angle) higher towards the center of the display.

Figure 2D:
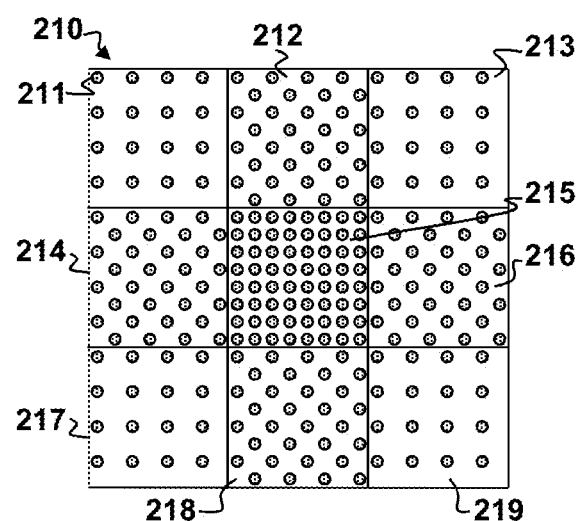
FIG. 2D illustrates an example of different pixel resolution for different regions of a screen of a FOV display in accordance with aspects of the present disclosure.

Based on the foregoing observations, it would be advantageous for an image 210 for a wide FOV display to have pixel densities that are smaller at edge regions 202, 204, 206, 208 than at center regions 205 and smaller at corner regions 201, 203, 207, and 209 than at the edge regions 202, 204, 206, 208 as shown in FIG. 2D. It would also be advantageous to render a conventional graphical image on the screen of a wide FOV display in a way that gets the same effect as varying the pixel densities across the screen without having to significantly modify the underlying graphical image data or data format or the processing of the data.

According to aspects of the present disclosure these advantages can be obtained in the graphics pipeline by use of metadata associated with each subsection that a primitive overlaps. The metadata determines a pixel resolution for the subsection. The metadata is used in processing pixels for the subsection to generate final pixel values for a viewport of a scene that is displayed on a display device in such a way that parts of the scene in two different subsections have different pixel resolution.

To implement this, transformation from virtual space to screen space and culling of primitives that are backfaced or obscured can be done in a conventional manner. Furthermore, primitives are only rendered once. The screen has a single pixel format and is divided into multiple subsections, each subsection contains multiple pixels.

Resolution may be specified on a per-subsection basis. If the resolution is lower than normal, only a portion of the multiple render target (MRT) data is used to generate the final pixels that are displayed. The metadata could specify other parameters as well. To facilitate texture processing, pixel shaders are configured to specify horizontal and vertical gradient scale factors for texture mapping.

System and Apparatus

Figure 3A:
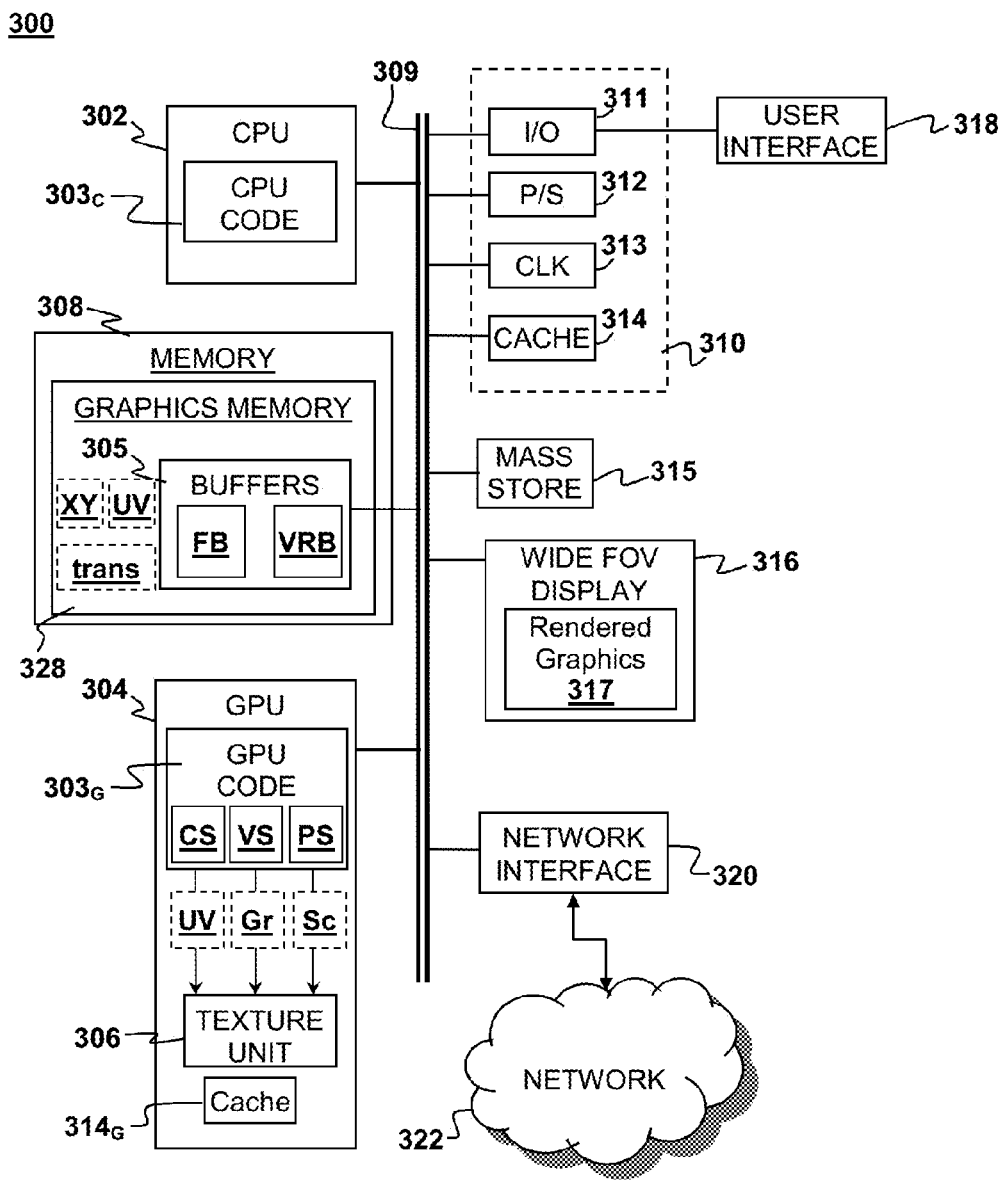
FIG. 3A is a block diagram of a graphics processing system in accordance with aspects of the present disclosure.

Aspects of the present disclosure include graphics processing systems that are configured to implement gradient scale correction in texture mapping. By way of example, and not by way of limitation, FIG. 3A illustrates a block diagram of a computer system 300 that may be used to implement graphics processing according to aspects of the present disclosure. According to aspects of the present disclosure, the system 300 may be an embedded system, mobile phone, personal computer, tablet computer, portable game device, workstation, game console, and the like.

The system 300 generally may include a central processor unit (CPU) 302, a graphics processor unit (GPU) 304, and a memory 308 that is accessible to both the CPU and GPU. The CPU 302 and GPU 304 may each include one or more processor cores, e.g., a single core, two cores, four cores, eight cores, or more. The memory 308 may be in the form of an integrated circuit that provides addressable memory, e.g., RAM, DRAM, and the like. The memory 308 may include graphics memory 328 that may store graphics resources and temporarily store graphics buffers 305 of data for a graphics rendering pipeline. The graphics buffers 305 may include, e.g., vertex buffers for storing vertex parameter values, index buffers for holding vertex indices, depth buffers (e.g., Z-buffers) for storing depth values of graphics content, stencil buffers, frame buffers for storing completed frames to be sent to a display, and other buffers. In the example shown in FIG. 3A, the graphics memory 328 is shown as part of the main memory. In alternative implementations, the graphics memory 328 could be a separate hardware component, possibly integrated into the GPU 304.

By way of example, and not by way of limitation, the CPU 302 and GPU 304 may access the memory 308 using a data bus 309. In some cases, it may be useful for the system 300 to include two or more different buses. The memory 308 may contain data that can be accessed by the CPU 302 and GPU 304. The GPU 304 may include a plurality of compute units configured to perform graphics processing tasks in parallel. Each compute unit may include its own dedicated local memory store, such as a local data share.

The CPU may be configured to execute CPU code $303_C$, which may include an application that utilizes graphics, a compiler and a graphics API. The graphics API can be configured to issue draw commands to programs implemented by the GPU. The CPU code $303_C$ may also implement physics simulations and other functions. The GPU 304 may be configured to operate as discussed above. In particular, the GPU may execute GPU code $303_G$, which may implement shaders, such as compute shaders CS, vertex shaders VS, and pixel shaders PS, as discussed above. To facilitate passing of data between the compute shaders CS and the vertex shaders VS the system may include one or more buffers 305, which may include a frame buffer FB. The GPU code $303_G$ may also optionally implement other types of shaders (not shown), such as pixel shaders or geometry shaders. Each compute unit may include its own dedicated local memory store, such as a local data share. The GPU 304 may include one or more texture units 306 configured to perform certain operations for applying textures to primitives as part of a graphics pipeline.

According to aspects of the present disclosure, the CPU code $303_c$ and GPU code $303_g$ and other elements of the system 300 are configured to implement a graphics pipeline. Certain stages of the graphics pipeline receive and utilize metadata MD associated with one or more subsections of a screen of the display device 316. The metadata determines a pixel resolution for the relevant subsection or subsections. The system 300 uses the metadata in processing pixels for the subsection(s) to generate final pixel values for a viewport of a scene that is displayed on the display device in such a way that parts of the scene in two different subsections can have different pixel resolution.

According to aspects of the present disclosure, in certain implementations the CPU code $303_c$ and GPU code $303_g$ and other elements of the system 300 receive and utilize metadata MD specifying an active pixel count for one or more subsections of a screen of the display device 316 that a graphics primitive overlaps. The metadata MD specifies different active pixel counts for subsections that are to have different pixel resolutions (number of pixels per unit area of the screen). In such implementations, the CPU code $303_c$ and GPU code $303_g$ and other relevant components of the system 300 can be configured to use the metadata MD in processing the pixels for the subsection to generate the final pixel values by performing pixel processing only on the specified number of active pixels for the relevant subsection or subsections. In this way pixel resolution can vary for different subsections of the screen of the display device 316 and the graphics processing load of the GPU 304 can be reduced for low-resolution regions of the display simply by reducing the active pixel count in the metadata MD for these regions relative to high resolution regions.

In some implementations, the metadata MD may be specified as an active pixel configuration per subregion for a regular array of subregions of consistent size, such as 32 by 32 pixel coarse rasterization tiles. In other implementations, the metadata MD may be specified as an array of horizontal and vertical screen coordinate ranges configuring a predefined pattern such as is depicted in FIG. 5A or 5B. It should be appreciated that many options exist for defining a set of subregions covering the screen area and for specifying an active pixel configuration for each subregion, and that the invention proposed here should not be considered to be limited to these exemplary cases.

In some implementations, the CPU code $303_c$, GPU code $303_g$, and texture unit 306 may be further configured to implement modifications to texture mapping operations in conjunction with screen location dependent variable pixel resolution. For example, a pixel shader PS and texture unit 306 can be configured to generate one or more texture coordinates UV per pixel location XY to provide a coordinate set for one or more texture mapping operations and calculate gradient values Gr from the texture coordinates UV for use in texture filtering.

In some implementations, the screen space area may be partitioned between regions with different pixel sample densities or distributions, resulting in abrupt transitions in the gradient values Gr and the resulting texture filtering at region boundaries. Per pixel texture gradient scale factors Sc can then be applied to the gradient values Gr, if necessary, to obtain gradient values Gr' which vary smoothly across region boundaries.

By way of example, and not by way of limitation, the texture unit(s) 306 other parts of the graphics pipeline described below may be implemented as special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
  One or more processor cores (e.g., microcontroller, microprocessor or digital signal processor (DSP) cores.
  Memory blocks, e.g., read only memory (ROM), random access memory (RAM), electrically erasable programmable read-only memory (EEPROM) and flash memory.
  Timing sources, such as oscillators or phase-locked loops.
  Peripherals, such as counter-timers, real-time timers, or power-on reset generators.
  External interfaces, e.g., industry standards such as universal serial bus (USB), FireWire, Ethernet, universal asynchronous receiver/transmitter (USART), serial peripheral interface (SPI) bus.
  Analog interfaces including analog to digital converters (ADCs) and digital to analog converters (DACs).
  Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

In some implementations, some or all of the functions of the texture unit 306 or other parts of the graphics pipeline may alternatively be implemented by appropriately configured software instructions executed by a software programmable general purpose computer processor. Such instructions may be embodied in a computer-readable medium, e.g., memory 308 or storage device 315.

The system 300 may also include well-known support functions 310, which may communicate with other components of the system, e.g., via the bus 309. Such support functions may include, but are not limited to, input/output (I/O) elements 311, power supplies (P/S) 312, a clock (CLK) 313 and cache 314. In addition to the cache 314, the GPU 304 may include its own GPU cache $314_G$, and the GPU may be configured so that programs running on the GPU 304 can read-through or write-though the GPU cache $314_G$.

The system 300 may include the display device 316 to present rendered graphics 317 to a user. In alternative implementations, the display device 316 is a separate component that works in conjunction with the system, 300. The display device 316 may be in the form of a flat panel display, head mounted display (HMD), cathode ray tube (CRT) screen, projector, or other device that can display visible text, numerals, graphical symbols or images. In particularly useful implementations, the display 316 is a large field of view (FOV) device having a curved screen. The display device 316 displays rendered graphic images 317 processed in accordance with various techniques described herein.

Figure 3B:
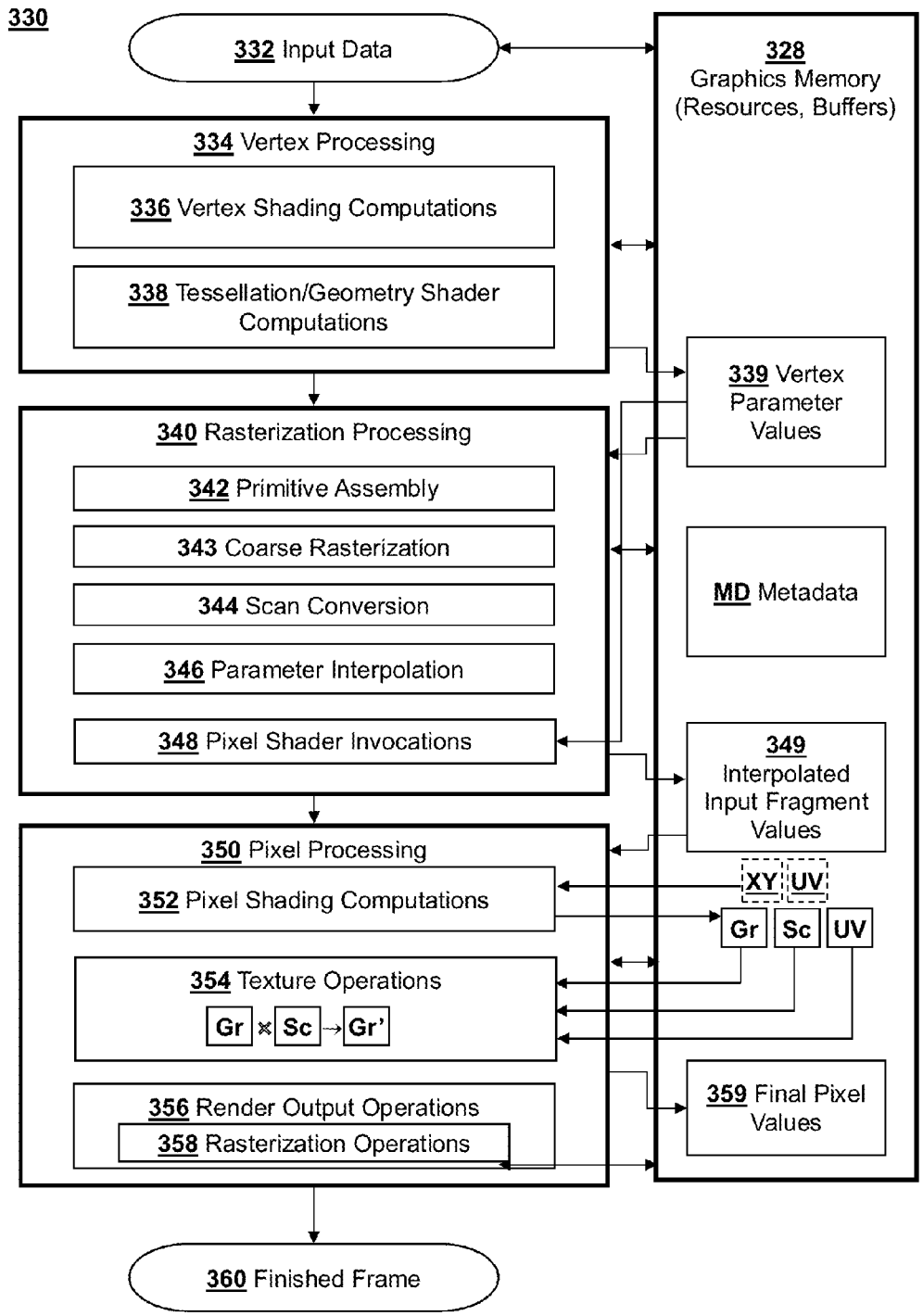
FIG. 3B is a block diagram of a graphics processing pipeline in accordance with aspects of the present disclosure.

The system 300 may optionally include a mass storage device 315 such as a disk drive, CD-ROM drive, flash memory, tape drive, or the like to store programs and/or data. The system 300 may also optionally include a user interface unit 318 to facilitate interaction between the system 300 and a user. The user interface 318 may include a keyboard, mouse, joystick, light pen, game controller, or other device that may be used in conjunction with a graphical user interface (GUI). The system 300 may also include a network interface 320 to enable the device to communicate with other devices over a network 322. The network 322 may be, e.g., a local area network (LAN), a wide area network such as the internet, a personal area network, such as a Bluetooth network or other type of network. These components may be implemented in hardware, software, or firmware, or some combination of two or more of these.
Graphics Pipeline According to aspects of the present disclosure, the system 300 is configured to implement portions of a graphics rendering pipeline. FIG. 3B illustrates an example of a graphics rendering pipeline 330 in accordance with aspects of the present disclosure.

The rendering pipeline 330 may be configured to render graphics as images that depict a scene having a two-dimensional or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 316.

Throughout the pipeline, various resources contained in the graphics memory 328 may be utilized at the pipeline stages and inputs and outputs to the stages may be temporarily stored in buffers contained in the graphics memory before the final values of the images are determined.

The rendering pipeline may operate on input data 332, which may include one or more virtual objects defined by a set of vertices that are set up in virtual space and have geometry that is defined with respect to coordinates in the scene. The early stages of the pipeline may include what is broadly categorized as a vertex processing stage 334 in FIG. 3B, and this may include various computations to process the vertices of the objects in virtual space. This may include vertex shading computations 336, which may manipulate various parameter values of the vertices in the scene, such as position values (e.g., X-Y coordinate and Z-depth values), color values, lighting values, texture coordinates, and the like. Preferably, the vertex shading computations 336 are performed by one or more programmable vertex shaders. The vertex processing stage may optionally include additional vertex processing computations, such as tessellation and geometry shader computations 338 which may be optionally used to generate new vertices and new geometries in virtual space. Once the stage referred to as vertex processing 334 is complete, at this stage in the pipeline the scene is defined by a set of vertices which each have a set of vertex parameter values 339.

The pipeline 330 may then proceed to rasterization processing stages 340 associated with converting the scene geometry into screen space and a set of discrete picture elements, i.e., pixels. The virtual space geometry (which can be three-dimensional) may be transformed to screen space geometry (which is typically two-dimensional) through operations that may essentially compute the projection of the objects and vertices from virtual space to the viewing window (or "viewport) of the scene. Subsets of the vertices are grouped to define sets of primitives.

The rasterization processing stage 340 depicted in FIG. 3B may include primitive assembly operations 342, which may set up the primitives defined by each set of vertices in the scene. Each vertex may be defined by an index, and each primitive may be defined with respect to these vertex indices, which may be stored in index buffers in the graphics memory 328. The primitives may preferably include at least triangles defined by three vertices each, but may also include point primitives line primitives, and other polygonal shapes. During the primitive assembly stage 342, certain primitives may optionally be culled. For example, those primitives whose indices indicate a certain winding order may be considered to be back-facing and may be culled from the scene.

By way of example, and not by way of limitation, where the primitives are in the form of triangles defined by vertices in three dimensional virtual space, the primitive assembly determines where on the screen of the display 316 each triangle is located. Clipping and screen space transformation operations are typically performed by the primitive assembly unit 342.

After primitives are assembled, the rasterization processing stage 340 may include scan conversion operations 344, which may sample the primitives at each pixel and generate fragments (sometimes referred to as pixels) from the primitives for further processing when the samples are covered by the primitive. The scan conversion operations include operations that take a primitive that has been converted to screen space coordinates and determines which pixels are part of that primitive. In some implementations, multiple samples for each pixel are taken within the primitives during the scan conversion operations 344, which may be used for anti-aliasing purposes. In certain implementations, different pixels may be sampled differently. For example, some edge pixels may contain a lower sampling density than center pixels to optimize certain aspects of the rendering for certain types of display device 316, such as head mounted displays (HMDs). The fragments (or "pixels") generated from the primitives during scan conversion 344 may have parameter values that may be interpolated to the locations of the pixels from the vertex parameter values 339 of the vertices of the primitive that created them. The rasterization stage 340 may include parameter interpolation operations 346 stage to compute these interpolated fragment parameter values 349, which may be used as inputs for further processing at the later stages of the pipeline.

According to aspects of the present disclosure, between primitive assembly 342 and scan conversion 344 certain operations take place that account for the fact that different subsections of the screen have different pixel resolutions. In particular implementations, once the screen location for the vertices of a primitive are known, a coarse rasterization 343 can be done to find all the predefined screen subsections (sometimes referred to herein as coarse rasterization tiles) that the primitive overlaps. For each subsection that the primitive overlaps, sub-section dependent metadata MD, e.g., an active pixel count and scaling parameters, are received that allow the vertex locations for the primitive and texture gradients to be adjusted to account for the pixel resolutions of the subsection. Scan conversion 344 and subsequent processing stages generate the final pixel values by performing pixel processing only on the specified number of active pixels for the relevant subsection or subsections.

The graphics pipeline 330 may further include pixel processing operations, indicated generally at 350 in FIG. 3B, to further manipulate the interpolated parameter values 349 and perform further operations determining how the fragments contribute to the final pixel values for display 316. Some of these pixel processing tasks include pixel shading computations 352 that further manipulate the interpolated parameter values 349 of the fragments. The pixel shading computations 352 may be performed by a programmable pixel shader or purpose built hardware in the GPU 304. Pixel shader invocations 348 may be initiated based on the sampling of the primitives during the rasterization processing stages 340. The pixel shading computations 352 may output values to one or more buffers 305 in graphics memory 328, sometimes referred to as render targets, or if multiple, as multiple render targets (MRTs). MRTs allow pixel shaders to optionally output to more than one render target, each with the same screen dimensions but potentially with a different pixel format. Render target format limitations often mean that any one render target can only accept up to four independent output values (channels) and that the formats of those four channels are tightly tied to each other. MRTs allow a single pixel shader to output many more values in a mix of different formats. The formats of render targets are "texture-like", in that they store values per screen space pixel, but, for various performance reasons, render target formats are becoming more specialized in recent hardware generations, sometimes (but not always) requiring what is called a "resolve" to reformat the data before it is compatible with being read in by the texture units 306.

Figure 4A:
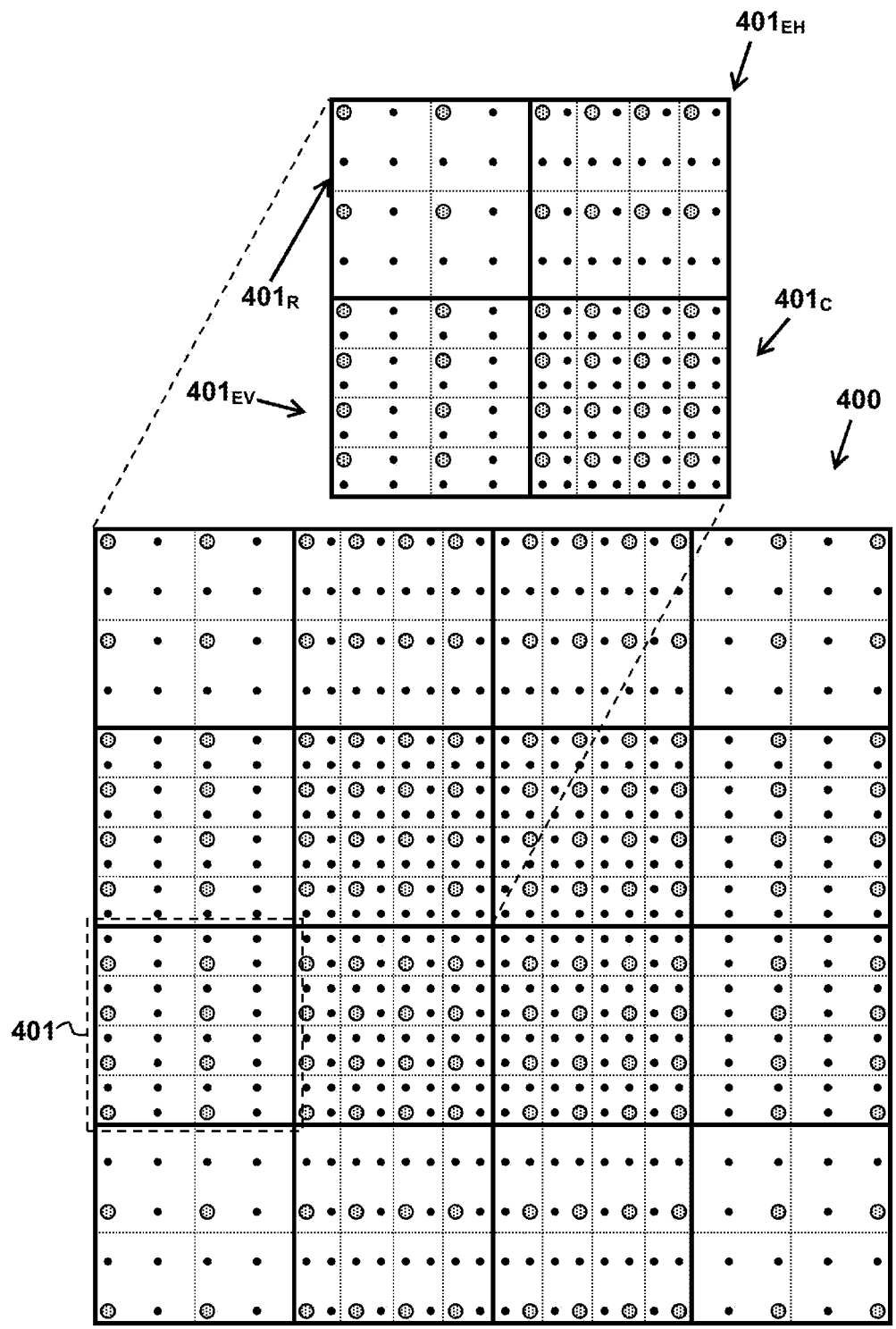
FIG. 4A is a schematic diagram illustrating a screen space in which in which pixel resolution varies by screen location in accordance with aspects of the present disclosure.

FIGS. 4A-4C schematically illustrate an example of different pixel resolutions in different subsections 401 of a screen 400 of the display 316. In this example the pixel data is formatted in a consistent manner for all pixels in all subsections 401 of the screen 400. By way of example, and not by way of limitation, the number of depth samples and color samples is the same for all pixels in all subsections 401 of the screen 400. Typically, there are more depth samples than color samples. By way of numerical example, and not by way of limitation, the subsections 401 may be 32 pixel×32 pixel coarse rasterization tiles, the number of depth samples may be 4 and the number of color samples may be 1. In alternative implementations, there can be a larger number of pixels (e.g., 64 pixel by 64 pixel) or a smaller number of pixels (e.g., 16 by 16) or a variable number of pixels (e.g. a mix of rectangular sizes) in each subsection and a correspondingly different number of subsections.

As shown in FIGS. 4A-4C the numbers of active pixels in each subsection 401 varies. In the illustrated example there is full resolution only in the four center subsections 401c. The other subsections are half resolution in one or both axes. For example, horizontal edge subsections $401_{EH}$ has full resolution in the horizontal direction and half resolution in the vertical direction and vertical edge subsections $401_{EV}$ has half resolution in the horizontal direction and full resolution in the vertical direction. Corner subsections $401_R$ have half resolution in both the vertical and horizontal directions. In this example, the graphics pipeline 330 can render the center subsections $401_C$ normally. In such implementations, the graphics pipeline 330 adjusts the vertical positions and texture mapping gradients for pixels in the horizontal edge subsection $401_{EH}$, adjusts the horizontal positions and texture mapping gradients for pixels in the vertical edge subsection $401_{EV}$, and adjusts the vertical and horizontal positions and texture mapping gradients for pixels in the corner subsections $401_R$.

Changing the number of active pixels per subsection according to the metadata MD does not change the pixel data (e.g., MRT data) stored in memory from subsection to subsection, although the utilization of that data does change. Specifically, as illustrated in FIG. 4C the graphics pipeline 330 would utilize all of the pixel data for the center subsections $401_C$, half the data for the horizontal edge subsections $401_{EH}$ and vertical edge subsection $401_{EV}$ and one quarter of the data for corner subsections $401_R$. Unused portions of the data for these subsections are lightly shaded in FIG. 4C. Although the size of the pixel data in memory has not changed, the computational load on the graphics processor 304 is reduced for the horizontal edge subsections $401_{EH}$, vertical edge subsection $401_{EV}$ and corner subsections $401_R$ since it does not need to process all of the pixel data for these subsections. In certain simple cases, e.g., in which rows of subregions always share the same vertical scale and columns always share the same horizontal scale, screenspace transforms can be used to pack all the parts of the pixel data together into one smaller rectangle and so also reduce the memory footprint. In other less regular cases, modifications to the metadata MD may similarly allow the encoding of memory offsets or indices into a table of offsets in order to allow more efficient packing of output into a smaller memory footprint.

In some implementations, each region 401 may correspond to a fixed size portion of a screen of the display 316. In other implementations, each region may correspond to a variable size portion of the display. In further implementations, the metadata MD can define each region 401 by ranges of pixels in the vertical and horizontal directions. In yet further implementations, the metadata MD can define each region by coarse rasterization tiles of some size, e.g. 32 pixels×32 pixels. The metadata associated with a particular region includes information specifying the active pixel configuration for that region. By way of example and not by way of limitation, the metadata may be stored in the form of a table in the memory 308 and/or graphics memory 328.

To utilize the active pixel count from the metadata MD the primitive assembly operations 342 can pull the vertex information for primitives from memory, clip primitives outside the viewing frustum of the scene being displayed, perform transformations of vertex positions from virtual space to screen space, and compute gradients for texture mapping. The primitive assembly operations 342 can determine the subsection or subsections in which a primitive is located. The scan converter operations 344 can include looking up the metadata MD that determines the resolution of the relevant subsection or subsections (e.g., an active pixel count from a table stored in memory 308 or graphics memory 328). The scan converter operations 344 can also perform computations to adjust vertex screen space positions.

In implementations involving variable active pixel count, certain mathematical processing is performed on a per-subsection basis after coarse rasterization 343. In particular, during conversion 344 the horizontal position H and vertical position V for each pixel need to be scaled and offset to updated positions H' and V' that depend on the horizontal and vertical positions of the subsection ($H_{SUB}$, $V_{SUB}$), a horizontal scale factor $H_{scale}$ and a vertical scale factor $V_{scale}$. The scale factors $H_{scale}$ and $V_{scale}$ can be stored in the metadata MD. The scale and offset operations can be represented mathematically as:

$$H'=(H-H_{SUB})*H_{\underline{scale}}+H_{SUB}$$

$$V'=(V-V_{SUB})*V_{scale}+V_{SUB}$$

Equivalently, these operations can be mathematically represented by:

$$H'=H*H_{scale}+H_{SUB}*(1-H_{scale})$$

$$V'=V*V_{scale}+V_{SUB}*(1-V_{scale})$$

Examples of horizontal and vertical scaling are illustrated in FIG. 4D. Specifically, a primitive 403 falling in a subsection having full resolution in the vertical and horizontal (e.g., a center subsection 401C) would not need to be scaled as shown in the upper left portion of FIG. 4D. A primitive 403 falling in a subsection having full horizontal resolution and ½ vertical resolution (e.g., a horizontal edge subsection $401_{EH}$) would not need to be scaled in the horizontal but would need to be scaled in the vertical by a factor of $V_{scale}$=0.5 as shown in the upper right portion of FIG. 4D. A primitive 403 falling in a subsection having ½ horizontal resolution and full vertical resolution (e.g., a vertical edge subsection $401_{EV}$) would need to be scaled by a factor of $H_{scale}$=0.5 in the horizontal but would not need to be scaled in the vertical as shown in the lower left portion of FIG. 4D. A primitive 403 falling in a subsection having ½ horizontal resolution and ½ vertical resolution (e.g., a corner subsection $401_C$) would need to be scaled by a factor of $H_{scale}$=0.5 in the horizontal and scaled by a factor of $V_{scale}$=0.5 in the vertical as shown in the lower right hand portion of FIG. 4D.

FIGS. 5A-5B graphically illustrate the advantage of implementations in which the horizontal and vertical active pixel counts are scaled by subsection. Both FIG. 5A and FIG. 5B represent a multiple render target (MRT) for pixels to be processed by the system 300 e.g., according to the graphics pipeline 330. In each drawing the factors $H_{scale}$/$V_{scale}$ are shown in various subsections for a screen 1440 pixels by 1440 pixels. In FIG. 5A, the factors $H_{scale}$/$V_{scale}$ are 1/1 for the center subsections accounting for a screen area of 800 pixel by 800 pixels. For vertical edge subsections accounting for two 320 pixel by 800 pixel areas the scale factors $H_{scale}/V_{scale}$ are 1/0.5. For horizontal edge subsections accounting for two 800 pixel by 320 pixel areas the scale factors are 0.5/1. For the four corner subsections accounting for four 320 pixel by 320 pixel areas the scale factors are 0.5/0.5. Because of the reduced processing load of the edge and corner subsections, processing load of the 1440 pixel by 1440 pixel MRT shown on the left in FIG. 5A is equivalent to processing an 1120 pixel by 1120 pixel MRT as shown on the right in FIG. 5A. Thus, the processing load on the GPU 300 would be reduced to approximately 60% of normal if the horizontal and vertical active pixel counts are scaled by subsection as illustrated in FIG. 5A. The scaling of the horizontal and vertical pixel counts is shown in a slightly more realistic fashion in FIG. 5B. However, the end result would be the same, a roughly 40% reduction in processing load compared to conventional processing.

There are many different possible configurations of the information for each subsection in the metadata MD. By way of example, and not by way of limitation, according to one configuration the metadata specifies active pixel counts in the horizontal and vertical directions out of 4, as in FIG. 5B. This representation uses 4 bits for each subsection: 2 bits for $H_{scale}$ (Hscale 1, 0.75, 0.5, or 0.25 for 4, 3, 2, or 1 active pixel columns out of every 4) and 2 bits for $V_{scale}$ (Vscale 1, 0.75, 0.5, or 0.25 for 4, 3, 2, or 1 active pixel rows out of every 4).

To implement the type of scaling depicted in FIG. 5A, only need 2 bits are required per subsection (Hscale=1 or 0.5, Vscale=1 or 0.5).

Storing metadata per screen subsection is quite flexible and does not involve a large amount of data. As a numerical example, consider a 4k2k display that contains 8192 32 pixel×32 pixel subsections. If four bits (one half byte) are needed for each subsection, the metadata MD for this display could contain as little as 4096 bytes of information. As noted above, aspects of the present disclosure are not limited to implementations involving 32 pixel×32 pixel subsections. Larger or smaller subsections may be used. A practical choice for the size of the subsections is the smallest screen area element that could have its parameters adjusted independently efficiently by rasterization hardware.

Certain aspects of the hardware implementation of screen rasterization, such as the resolution of coarse rasterization tiles, may set a minimum reasonable resolution for pixel subsections in some hardware implementations. The optimum metadata format will depend on a tradeoff between the flexibility to define arbitrary screen configurations and the storage size required for metadata, which may in turn determine the required storage type and performance of the implementation. For instance, metadata alternatively could be stored for simple patterns such as in FIG. 5A and FIG. 5B as several horizontal or vertical screen ranges sharing the same scale, resulting in limited flexibility but extremely small metadata which could trivially fit in hardware registers.

There are several possible enhancements to the configuration of the metadata MD. According to one enhancement the metadata could be configured in a way that increases the efficiency of representation of pixel data in memory. Specifically, each subsection's data could be 16 bits: 2 bits for $H_{scale}$, 2 bits for $V_{scale}$ and 4 bits for an index. These four bits could index up to 16 sets of MRT addresses, one address for each different resolution. All areas of same resolution would then be targeted to the same MRT set.

For example, in some implementations the metadata MD could encode an index into multiple copies of at least some of the registers which currently define the properties of the render targets (MRTs) or otherwise control the rasterization 340 and post-rasterization (e.g., pixel processing 350) stages of the graphics pipeline 330. In such implementations, the index is used to select from a palette of hardware register values, some of which set the properties of all MRTs.

For instance, if the metadata MD were 4 bits per tile, that could store a 4 bit index with 16 values, and, if some of the render target registers were expanded to hold a palette of 16 values, the metadata index could select which palette entry of MRT settings to use when rendering this tile. In general, one could store an index with more or fewer bits depending on how large a palette the hardware of the GPU 304 can support.

By way of example, and not by way of limitation, a minimal version of such implementations would be to expand the registers which store the MRT base address and dimensions into arrays, and perhaps add some new registers containing the offset and scale of the tile transformation which would also be indexed by the same index. Other MRT registers controlling the buffer format and so on would remain constant for all array elements of any one MRT. As pixel shaders PS need to know the render target format, it isn't necessary to change it per coarse rasterization tile.

Such implementations can be thought of as implementing the metadata MD as one or more "palettes" of render target configuration register values with one or more selection indices per subsection (coarse rasterization tile or perhaps larger) stored in the metadata. By way of example, the metadata MD could store a palette index per tile that the hardware of the GPU 304 uses to look up a settings block for all render targets. The rendering in such implementations can be summarized as follows:

1. Coarse rasterize to "virtual 32×32 pixel" coarse rasterization tiles.
2. For each virtual coarse tile, look up a metadata index.
3. Use the metadata index to look up the Hscale and Vscale and apply them to the primitive before rasterizing the primitive to coarse rasterization tiles, pixels, or samples.
4. Later, during output operations 356 after pixel shading 352, the metadata index is again used to look up the x and y offset, base addresses, and pitches used to perform all render target addressing.

Picking the Hscale, Vscale from a palette of e.g., 1.0, 0.75, 0.5, 0.25, is particularly useful where, e.g., each coarse rasterization tile in the hardware of the GPU 304 contains a 4×4 array of tiles (each 8×8 pixels). This means that these 4 scale factors all exactly match one coarse rasterization tile to an integral number of tiles, which should make the rest of the rasterization pipeline run at full efficiency (aside from the effective loss in coarse rasterization efficiency at the top).

In addition, the metadata MD could include an additional 16 bits that defines a subsection offset to allow for custom swizzle. The subsection offset is multiplied by tile size and used to determine the area of MRT to use. As used herein, and as is generally understood to those skilled in the art of computer graphics, swizzling refers rearranging the elements of a vector. In terms of linear algebra a swizzle is equivalent to multiplication of the vector by a permutation matrix. Swizzles are common in General Purpose Processing on Graphics Units (GPGPU) applications in which the GPU 304 performs computations normally performed by the CPU 302.

"Swizzling" or "tiling" in the context of rendering to a render target refers to rearranging the order of pixels in memory. "Tiling" or "Surface tiling" is becoming a more common term for this type of rearrangement of pixel ordering in memory. "Swizzling" is now more often used to refer to a specific case known as Morton Ordering that is used by textures. Rearranging the order of pixels in memory is done to increase the data locality (aka coherence) of output from an inherently 2 dimensional process (rasterization of a polygon) to a 1 dimensional target (memory). By way of example, and not by way of limitation, if a render target is stored as a simple array of rows of pixels, the output of rasterizing a tall thin triangle would be a few pixels in each row spread over many rows, which would hit a lot of cache lines in memory. By reordering pixels in memory to also place vertically nearby pixels close in memory as well as horizontally nearby pixels, the rasterization stage 340 can achieve better data locality and more uniform performance relative to polygon orientation.

According to aspects of the present disclosure, the tiling parameters of the render targets could also be indexed by the metadata MD, e.g., the same index as the render target base address and pitch or a separate index.

According to another enhancement, the metadata MD could allow for different pixel formats as well through the aforementioned indices. Each pixel format associated with a different index could specify a different color and Z sample count, a different color and Z sample location, different enhanced quality anti-aliasing (EQAA) parameters, or different unroll parameters or combinations of two or more of these. Implementations involving this type of enhancement would then need to kick off pixel shader wavefronts before they are fully packed (or start new wavefronts) under a variety of situations.

Such enhancements involve palletizing the registers the control the color and Z sample count and other similar EQAA settings which could vary per coarse rasterization tile. In implementations involving such enhancements, it would make sense for the metadata index that controls the sample counts to have the option to be independent of the metadata index that controls the MRT addressing. In implementations involving texture gradient scale correction, texture gradient correction factors can also be indexed by the same index that controls the sample configuration.

FIG. 4E illustrates an example of how the metadata MD could be configured to specify different active pixels for different subsections 401 of the display screen 316. In the example illustrated in FIG. 4E, central subsections of the screen 316 are desired to have full resolution, and subsections further from the center have progressively lower resolution. By way of example, and not by way of limitation, in implementations involving varying the active pixel count the metadata MD can define Hscale and Vscale values corresponding to full resolution (4), ¾ resolution (3), ½ resolution (2) and ¼ resolution (4). By way of example and not by way of limitation, the metadata MD may be stored in the form of a table in the memory 308 and/or graphics memory 328.

In some implementations, the metadata is fixed for the optics and FOV of the display 316. An example of such a metadata configuration is shown schematically in FIG. 4D. In alternative implementations, the metadata could vary to implement foveal rendering for eye tracking. In such implementations, the system 300 includes hardware for tracking a user's gaze, i.e., where a user's eye is pointing, and relating this information to a corresponding screen location that the user is looking at. One example of such hardware could include a digital camera in a known location with respect to the screen of the display device 316 and pointed in the general direction of a user. The digital camera could be part of the user interface 318 or a separate component. The CPU code $303_C$ could include image analysis software that analyzes images from the camera to determine (a) if the user is in the image; (b) if the user is facing the camera; (c) if the user is facing the screen; (d) if the user's eyes are visible; (e) the orientation of the pupils of the user's eyes relative to the user's head; and (f) the orientation of the user's head relative to the camera. From the known position and orientation of the camera with respect to the screen, the orientation of the pupils of the user's eyes relative to the user's head and the orientation of the user's head relative to the camera the image analysis software could determine whether the user is looking at the screen and, if so, screen space coordinates for the portion 401 of the screen the user is looking at. The CPU code $303_C$ could then pass these screen coordinates to the GPU code $303_G$, which could determine the subsection or subsections containing the portion 401. The GPU code could then modify the metadata MD accordingly so that the pixel resolution is highest in the subsection or subsections containing the portion 401 and progressively lower in subsections further away from the portion 401, as shown in FIG. 4F.

Referring again to FIG. 3B, in implementations involving variable active pixel count by subsection, pixel processing 350 for each subsection proceeds mostly normally for the active pixels in each subsection. The pixel processing 350 generally culminates in render output operations 356, which may include what are commonly known as raster operations (ROP). Rasterization Operations (ROP) is simply run multiple times per pixel, once for each render target among the multiple render targets (MRTs). During the output operations 356, the final pixel values 359 may be determined in a frame buffer, which may optionally include merging fragments, applying stencils, depth tests, and certain per sample processing tasks. The final pixel values 359 include the collected output to all active render targets (MRTs). The GPU 304 uses the final pixel values 359 to make up a finished frame 360, which may optionally be displayed on the pixels of the display device 316 in real-time.

The rasterization processing operations 340 typically include interpolation of input parameters written per vertex by the vertex shader, typically including input texture coordinates, colors, positions, normals, and other values. Parameter interpolation 346 requires barycentric interpolant values to be generated per pixel indicating the position of each pixel or sample within the primitive being rendered. Each parameter component may then be interpolated between values at the primitive vertices to produce a value at the pixel sample location. In implementations involving varying active pixel count by subsection, these barycentric interpolant values may be corrected to account for varying pixel configurations from subsection to subsection.

The pixel processing operations 350 typically include texture mapping operations 354, which may be performed to some extent by one or more pixel shaders PS and to some extent by the texture units 306. The pixel shader computations 352 include calculating texture coordinates UV from screen space coordinates XY, and sending the texture coordinates to the Texture Operations 354, and receiving texture data TX. The texture coordinates UV could be calculated from the screen space coordinates XY in an arbitrary fashion, but typically are calculated from interpolated input values or sometimes from the results of previous texture operations. Gradients Gr are often directly calculated from quads of texture coordinates by the texture units 306 (Texture Operations hardware units), but can optionally be calculated explicitly by the pixel shader computations 352 and passed to the texture operations 354 rather than relying on the texture units 306 to perform the default calculation.

The texture operations 356 generally include the following stages, which can be performed by some combination of a pixel shader PS and a texture unit 306. First, one or more texture coordinates UV per pixel location XY are generated and used to provide a coordinate set for each texture mapping operation. Gradient values Gr are calculated from the texture coordinates UV. Per pixel gradient scale factors Sc are configured to adjust corresponding gradient values Gr to corresponding adjusted gradient values Gr'. The gradient scale factors Sc can modify the gradient values Gr to smoothly transition them between regions of the display device 316 having different pixel resolutions. In implementations involving varying active pixel count by subsection, the gradients Gr may be corrected by the inverse of the scale factors $H_{scale}$ and $V_{scale}$ or may otherwise be corrected based on a transformation derived from the pixel configuration metadata MD.

In certain graphics applications bitmapped textures are "painted" onto the polygon. In such a case each pixel value drawn by the output device is determined from one or more pixels sampled from the texture. As used herein, a bitmap generally refers to a data file or structure representing a generally rectangular grid of pixels, or points of color, on a computer monitor, paper, or other display device. The color of each pixel is individually defined. For example, a colored pixel may be defined by three bytes—one byte each for red, green and blue. A bitmap typically corresponds bit for bit with an image displayed on a screen, probably in the same format as it would be stored in the display's video memory or maybe as a device independent bitmap. A bitmap is characterized by the width and height of the image in pixels and the number of bits per pixel, which determines the number of colors it can represent.

The process of transferring a texture bitmap to a surface often involves the use of texture MIP maps (also known as mipmaps). The letters "MIP" in the name are an acronym of the Latin phrase multum in parvo, meaning "much in a small space". Such mipmaps are pre-calculated, optimized collections of bitmap images that accompany a main texture, intended to increase rendering speed and reduce artifacts.

Each bitmap image of the mipmap set is a version of the main texture, but at a certain reduced level of detail (LOD). Although the main texture would still be used when the view is sufficient to render it in full detail, the graphics hardware rendering the final image switches to a suitable mipmap level (or interpolates between the two nearest levels) when the texture is viewed from a distance, or at a small size. Rendering speed increases since the number of texture pixels ("texels") being processed can be much lower than with simple textures. Artifacts may be reduced since the mipmap images are effectively already anti-aliased, taking some of the burden off the real-time rendering hardware.

The blending between mipmap levels typically involves some form of texture filtering. As used herein, texture filtering refers to a method used to map texels (pixels of a texture) to points on a 3D object. A simple texture filtering algorithm may take a point on an object and look up the closest texel to that position. The resulting point then gets its color from that one texel. This simple technique is sometimes referred to as nearest neighbor filtering. More sophisticated techniques combine more than one texel per point. The most often used algorithms in practice are bilinear filtering and trilinear filtering using mipmaps. Anisotropic filtering and higher-degree methods, such as quadratic or cubic filtering, result in even higher quality images.

Textures are typically square and must have side lengths equal to a power of 2. If, e.g., a texture has a basic size of 256 by 256 pixels, then the associated mipmap set may contain a series of 8 images, each half the size of the previous one: 128×128 pixels, 64×64, 32×32, 16×16, 8×8, 4×4, 2×2, and 1×1 (a single pixel). If, for example, this texture is mapped onto a 40×40 pixel portion of a screen space, then an interpolation of the 64×64 and the 32×32 mipmaps would be used. As used herein the term "screen space" refers generally to the set of coordinates passed to the display buffer in the graphics pipeline.

The key operation in the process of determining the appropriate mipmap level involves determining the area covered in texture coordinate space (sometimes referred to as UV coordinate space) for a corresponding area of pixel locations from screen space (sometimes referred to as XY coordinate space). In general terms, screen space gradients du_dx, dv_dx, du_dy, dv_dy of interpolated texture UV coordinates are calculated from U and V values sampled at XY space pixel locations in the relevant portion of the scene. In some implementations, a single texture coordinate gradient is calculated for each screen space direction X and Y by calculating the magnitude of the gradients of all texture coordinates for a change in screen X coordinate holding screen Y fixed (sometimes referred to as the magnitude of du_dx, dv_dx) and with respect to a change in screen Y coordinate holding screen X fixed (sometimes referred to as the magnitude of du_dy, dv_dy). For non-anisotropic texture lookups, the gradient with the larger magnitude among these two is used to select level of detail (LOD). For anisotropic texturing, the smaller magnitude gradient is used to select the (LOD), and the texture is sampled in a line corresponding to the larger magnitude gradient.

Also note that the above calculation can be generalized to 1, 2, 3, or more texture coordinate dimensions. Typical hardware calculates a 1D magnitude in U-space or a 2D magnitude in UV-space or a 3D magnitude in UVW-space depending on the texture dimensionality. Thus, aspects of the present disclosure are not limited to implementations involving two texture coordinate dimensions.

Per-Pixel Gradient Scale Correction

In some implementations, the texture gradients du_dx, dv_dx, du_dy, dv_dy are scaled on a per-pixel basis to account for discontinuities in pixel resolution across a display. The basic concept is illustrated in FIGS. 6A-6C.

Figure 6A:
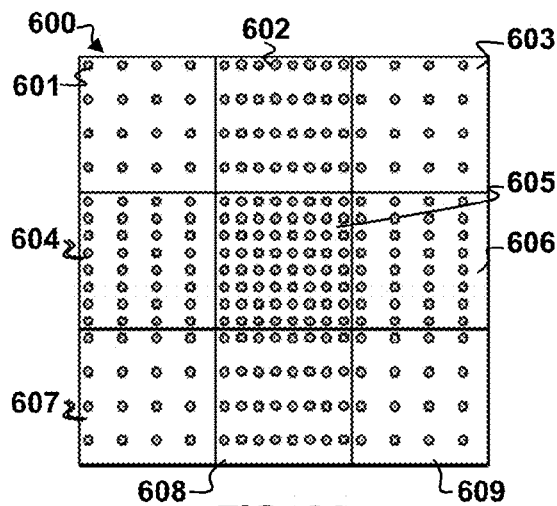
FIGS. 6A-6E illustrate an example of per-pixel gradient scale correction in applying textures in accordance with an alternative aspect of the present disclosure.
Figure 6B:
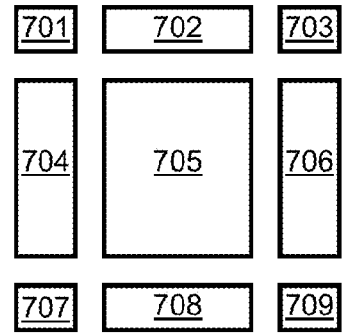
Figure 6C:
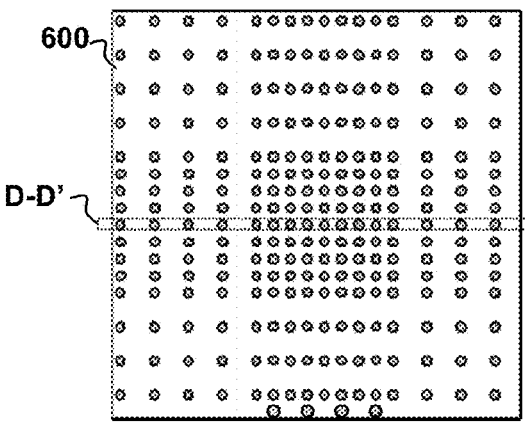

As shown in FIG. 6A and FIG. 6B the display area may be divided into two or more regions 601, 602, 603, 604, 605, 606, 607, 608, and 609 of different pixel resolution. Each region may have a resolution that is related to the solid angle subtended by the region of the display, e.g., in the case of a head mounted display (HMD). By way of example, and not by way of limitation, the central region 605 may have a nominal or standard pixel resolution $R_0$. Edge regions 602, 604, 606, 608 could have half the standard resolution $\frac{1}{2}R_0$, e.g., half the pixels in these regions would be "turned off" or not rendered on the display. Corner regions 601, 603, 607, and 609 could have on quarter the standard resolution $\frac{1}{4}R_0$, e.g., three quarters of the pixels in these regions would be "turned off" or not rendered on the display. FIG. 6B shows these different regions drawn to different sizes according to the resolution of each region.

Figure 6D:
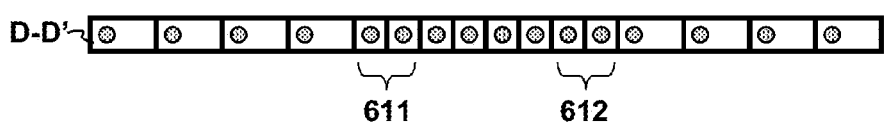

Gradients might also need to be adjusted for pixels near the boundaries between adjacent regions. For example, in FIG. 6C the lines marking the boundaries between the sections have been removed. However, discontinuities in resolution between neighboring regions make the boundaries visible. The GPU can be configured to adjust gradients for pixels near the boundaries between regions to smooth out the discontinuities, making them less visible. For example, as shown in FIG. 6D, horizontal gradients for selected pixels 611, 612 in the full resolution central region 605 in the row D-D' in FIG. 6C can be scaled so as to become progressively blurrier towards the half resolution edge regions 604, 606.

Alternatively, gradients in the half resolution edge regions 604, 606 can be scaled so as to become progressively sharper towards the full resolution central region 605.

Figure 6E:
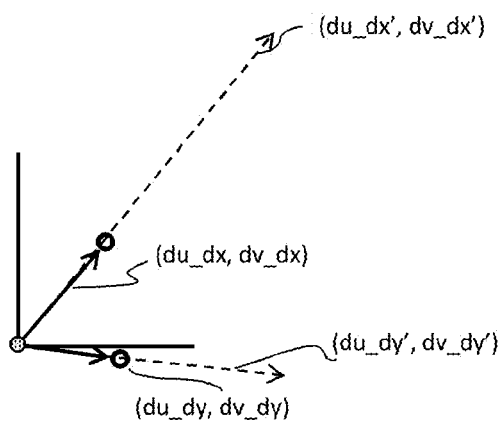

Generalized scaling of the gradients to account for differing resolution can be understood with reference to FIG. 6E. Gradients in UV space (du_dx, dv_dx), (du_dy, dv_dy) are calculated normally. The gradients can then be multiplied by gradient scale factors scaleX, scaleY on a per-pixel basis to produce the final adjusted gradients (du_dx', dv_dx'), (du_dy',dv_dy') that the texture unit uses to determine the appropriate mipmap level.

$$du\_dx' = du\_dx * scaleX$$

$$dv\_dx' = dv\_dx * scaleX$$

$$du\_dy' = du\_dy * scaleY$$

$$dv\_dy' = dv\_dy * scaleY$$

The gradient scale factors scaleX and scaleY, would be passed to the texture unit 306, which would use them to calculate the final adjusted gradients.

Suitable values for gradient scale factors scaleX, scaleY can be determined empirically by iterating the gradient scale factor values applied to selected pixels proximate the boundaries of neighboring regions of different pixel resolution. A range of suitable values for the gradient scale factors can be determined from the relative pixel resolutions of the neighboring regions. For example, along row D-D' the pixel resolution changes from ½R in region 604 to R in region 605 and again to ½R in region 606. The gradient scale value scaleX would transition from roughly 1 to roughly 2 over several pixels in region 605 proximate the boundaries with regions 604 and 606. Similarly, gradient scale value scaleX would transition from a value of roughly 1 to a value of roughly 2 over several pixels in region 608 proximate the boundaries with regions 607 and 609. The gradient scale factors may be varied between the two values over several pixels, e.g., roughly 4 to 8 pixels.

The texture unit 306 may use the final adjusted gradients to select the appropriate LOD to apply to one or more primitives from the final adjusted gradients.

Additional Aspects

Additional aspects of the present disclosure include a graphics processing method, comprising: receiving data representing one or more vertices for a scene in a virtual space;

performing primitive assembly on the vertices to compute projections of the vertices from virtual space onto a viewport of the scene in a screen space of the display device containing a plurality of pixels, the plurality of pixels being subdivided into a plurality of subsections;

for each primitive that has been converted to screen space coordinates, determining which pixels of the plurality of pixels are part of each primitive;

performing coarse rasterization for each primitive to determine which subsection or subsections the primitive overlaps;

receiving metadata associated with the subsection a primitive overlaps, wherein the metadata that determines a pixel resolution for the subsection; and using the metadata in processing pixels for the subsection to generate final pixel values for the viewport of the scene that is displayed on the display device in such a way that parts of the scene in two different subsections have different pixel resolution.

An additional aspect of the present disclosure include a graphics processing method in which different regions of a screen of a display device have different pixel resolution.

Another additional aspect is a computer-readable medium having computer executable instructions embodied therein that, when executed, implement one or both of the foregoing methods.

A further aspect is an electromagnetic or other signal carrying computer-readable instructions for performing one or both of the foregoing methods.

An additional further aspect is a computer program product downloadable from a communication network and/or stored on a computer-readable and/or microprocessor-executable medium, characterized in that it comprises program code instructions for implementing one or both of the foregoing methods.

Another additional further aspect is a graphics processing system configured to implement one or both of the foregoing methods.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for graphics processing with a graphics processing system having a graphics processing unit coupled to a display device, comprising:

receiving data representing one or more vertices for a scene in a virtual space;

performing primitive assembly on the vertices to compute projections of the vertices from virtual space onto a viewport of the scene in a screen space of the display device containing a plurality of pixels, the plurality of pixels of the display device being subdivided into a plurality of subsections;

for each primitive that has been converted to screen space coordinates, determining which pixels of the plurality of pixels are part of each primitive;

performing coarse rasterization for each primitive to determine which subsection or subsections the primitive overlaps;

receiving metadata associated with the subsection a primitive overlaps, wherein the metadata is associated with the screen, wherein the metadata determines a pixel resolution for the subsection, wherein the pixel resolution is a number of active pixels per unit area of the screen for the subsection; and using the metadata in processing pixels for the subsection to generate final pixel values for the viewport of the scene that is displayed on the display device in such a way that parts of the scene in two different subsections have different pixel resolution, wherein using the metadata in processing pixels for the subsection does not change pixel data stored in a memory.

2. The method of claim 1, wherein the metadata specifies a number of active pixels in the subsection and wherein using the metadata in processing the pixels for the subsection to generate the final pixel values includes performing pixel processing only on the specified number of active pixels for the subsection.

3. The method of claim 2, wherein the metadata includes scaling parameters and wherein using the metadata in processing pixels for the subsection includes adjusting vertex locations in screen space and texture space gradients for the primitive to account for the pixel resolution for the subsection.

4. The method of claim 2, wherein the metadata specifies that all the pixels for the subsection are active pixels when the pixel resolution for the subsection is a standard resolution and wherein the metadata specifies that less than all the pixels for the subsection are active pixels when the pixel resolution subsection is less than the standard resolution.

5. The method of claim 2, wherein the metadata specifies a standard resolution when the subsection is located at or near a center of the screen space and wherein the metadata specifies less than the standard resolution when the subsection is located at or near an edge or corner of the screen space.

6. The method of claim 2, wherein the metadata includes one or more scaling parameters and wherein using the metadata in processing pixels for the subsection includes adjusting vertex locations in screen space, and texture space gradients and parameter barycentric interpolant values for the primitive to account for the pixel resolution for the subsection and adjusting texture space gradients includes performing per-pixel gradient scale correction in applying textures to account for different pixel resolutions for neighboring subsections of the plurality of subsections.

7. The method of claim 1, wherein the display device is characterized by a field of view of 90 degrees or more.

8. The method of claim 1, wherein the display device is a head-mounted display device.

9. The method of claim 1, wherein the screen space corresponds to a curved screen.

10. The method of claim 1, further comprising determining a portion of a screen of the display device that a user is looking at and wherein the metadata is configured to vary the pixel resolution such that pixel resolution is highest for one or more subsections of the screen containing the portion the user is looking at.

11. The method of claim 1, wherein the metadata is static for given optics and a given field of view of the display device.

12. The method of claim 1, wherein the metadata specifies a number of active pixels in the subsection and wherein using the metadata in processing the pixels for the subsection to generate the final pixel values includes performing pixel processing only on the specified number of active pixels for the subsection, and wherein the metadata is configured to specify different numbers of active pixels for different subsections of the plurality of subsections.

13. The method of claim 1, wherein, each subsection of the plurality of subsections corresponds to a fixed size portion of the screen space.

14. The method of claim 1, wherein each subsection of the plurality of subsections corresponds to a variable size portion of the screen space.

15. The method of claim 1, wherein the metadata defines each subsection of the plurality of subsections by ranges of pixels in vertical and horizontal directions.

16. The method of claim 1, wherein the metadata defines each subsection of the plurality of subsections by coarse rasterization tiles of some size.

17. The method of claim 1, wherein output screen areas are packed into a smaller memory footprint by exploiting regularities in the subsection and pixel configuration metadata.

18. The method of claim 1, wherein output screen areas are packed into a smaller memory footprint by embedding additional information into the metadata to encode output memory offsets.

19. The method of claim 1, wherein a portion of the metadata associated with a particular subsection of the plurality of subsections includes information specifying a number of active pixels for the particular subsection.

20. The method of claim 1, wherein the metadata is stored in the form of a table in a memory and/or graphics memory.

21. A non-transitory computer-readable medium having computer executable instructions embodied therein that, when executed, implement the method of claim 1.

22. A system for graphics processing, comprising
a memory storing executable instructions; and
a graphics processing unit configured to implement a method by executing the instructions to cause the system to:
receive data representing one or more vertices for a scene in a virtual space;
perform primitive assembly on the vertices to compute projections of the vertices from virtual space onto a viewport of the scene in a screen space of a display device containing a plurality of pixels, the plurality of pixels of the display device being subdivided into a plurality of subsections;
determine which pixels of the plurality of pixels are part of each primitive, that has been converted to screen space coordinates;
perform course rasterization for each primitive to determine which subsection or subsections the primitive overlaps;
receive metadata associated with the subsection a primitive overlaps, wherein the metadata is associated with the screen, wherein the metadata determines a pixel resolution for the subsection, wherein the pixel resolution is a number of active pixels per unit area of the screen for the subsection; and
use the metadata in processing pixels for the subsection to generate final pixel values for the viewport of the scene that is displayed on the display device in such a way that parts of the scene in two different subsections have different pixel resolution, wherein using the metadata in processing pixels for the subsection does not change pixel data stored in a memory.

23. The system of claim 22, the metadata specifies a number of active pixels in the subsection and wherein the graphics processing unit is configured to use the metadata in processing the pixels for the subsection to generate the final pixel values by performing pixel processing only on the specified number of active pixels for the subsection.

24. The system of claim 23, wherein the metadata specifies that all the pixels for the subsection are active pixels when the pixel resolution for the subsection is a standard resolution and wherein the metadata specifies that less than all the pixels for the subsection are active pixels when the pixel resolution subsection is less than the standard resolution.

25. The system of claim 23, wherein the metadata includes scaling parameters and wherein the GPU is configured to use the metadata in processing pixels for the subsection by adjusting vertex locations in screen space, and texture space gradients and parameter barycentric interpolant values for the primitive to account for the pixel resolution for the subsection and wherein the GPU is configured to adjust the texture space gradients by performing per-pixel gradient scale correction in applying textures to account for different pixel resolutions for neighboring subsections of the plurality of subsections.

26. The system of claim 22, wherein the metadata specifies a standard resolution when the subsection is located at or near a center of the screen space and wherein the metadata specifies less than the standard resolution when the subsection is located at or near an edge or corner of the screen space.

27. The system of claim 22, wherein the display device is characterized by a field of view of 90 degrees or more.

28. The system of claim 22, wherein the display device is a head-mounted display device.

29. The system of claim 22, wherein the screen space corresponds to a curved screen.

30. The system of claim 22, further comprising the display device.

31. The system of claim 22, wherein the system is configured to determine a portion of a screen of the display device that a user is looking at and wherein the metadata is configured to vary the pixel resolution such that pixel resolution is highest for one or more subsections of the screen containing the portion the user is looking at.

32. The system of claim 22, wherein the system is configured to use static metadata for given optics and field of view of the display device.

33. The system of claim 22, wherein the metadata specifies a number of active pixels in the subsection and wherein the graphics processing unit is configured to use the metadata in processing the pixels for the subsection to generate the final pixel values by performing pixel processing only on the specified number of active pixels for the subsection, and wherein the metadata is configured to specify different numbers of active pixels for different subsections of the plurality of subsections.

34. The system of claim 22, wherein, each subsection of the plurality of subsections corresponds to a fixed size portion of the screen space.

35. The system of claim 22, wherein each subsection of the plurality of subsections corresponds to a variable size portion of the screen space.

36. The system of claim 22, wherein the metadata defines each subsection of the plurality of subsections by ranges of pixels in vertical and horizontal directions.

37. The system of claim 22, wherein the metadata defines each subsection of the plurality of subsections by coarse rasterization tiles of some size.

38. The system of claim 22, wherein output screen areas are packed into a smaller memory footprint by exploiting regularities in the subsection and pixel configuration metadata.

39. The system of claim 22, wherein output screen areas are packed into a smaller memory footprint by embedding additional information into the metadata to encode output memory offsets.

40. The system of claim 22, wherein a portion of the metadata associated with a particular subsection of the plurality of subsections includes information specifying a number of active pixels for the particular subsection.

41. The system of claim 22, wherein the metadata is stored in the form of a table in a memory and/or graphics memory.

* * * * *